(12) United States Patent
Kadu et al.

(10) Patent No.: US 8,873,576 B2
(45) Date of Patent: Oct. 28, 2014

(54) DYNAMIC CLOCK GATING IN A NETWORK DEVICE

(75) Inventors: Sachin P. Kadu, Fremont, CA (US); John J. Dull, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 67 days.

(21) Appl. No.: 13/618,411

(22) Filed: Sep. 14, 2012

(65) Prior Publication Data

US 2014/0079073 A1    Mar. 20, 2014

(51) Int. Cl.
*H04L 12/66* (2006.01)

(52) U.S. Cl.
USPC .......................................... 370/463

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| 7,966,468 | B1* | 6/2011 | Simeral et al. | 711/167 |
| 2005/0251699 | A1* | 11/2005 | Jacobson | 713/400 |
| 2007/0074054 | A1* | 3/2007 | Chieh | 713/300 |
| 2009/0193281 | A1* | 7/2009 | Blaner et al. | 713/500 |
| 2011/0271134 | A1* | 11/2011 | Hofmann | 713/500 |

* cited by examiner

*Primary Examiner* — Jung-Jen Liu
(74) *Attorney, Agent, or Firm* — Brinks Gilson & Lione

(57) ABSTRACT

A switch device that includes a switch pipeline stage to process packet data may selectively clock multiple pipeline sub-stages within the switch pipeline stage. The switch device may provide a first clock to processing logic of a first sub-stage independently of providing a second clock to a processing logic of second sub-stage within the switch pipeline stage. Clocking logic associated with a current switch pipeline stage may receive an event indication, such as an event indication from a previous pipeline stage responsive to processing of packet data by the previous pipeline stage. In response, the clocking logic associated with the current switch pipeline stage may determine a clocking time to issue a clock to a selected pipeline sub-stage in the current switch pipeline stage. The clocking logic may also issue the clock to the selected pipeline sub-stage at the clocking time.

20 Claims, 8 Drawing Sheets

DYNAMIC CLOCK GATING IN A NETWORK DEVICE

TECHNICAL FIELD

This disclosure relates to dynamic clock gating. This disclosure also relates to dynamic clock gating in a network device.

BACKGROUND

Continual development and rapid improvement in modern technology has resulted in the widespread availability and use of electronic devices. These electronic devices are used in nearly every facet of life today and are often networked together, with network switches supporting this important functionality. Electronic device and component manufacturers are continually developing additional features and functionality that consume power at increasing rates. As electronic devices, including network switches, become increasingly portable and functionally powerful, manufacturers and consumers have an increasing interest in improving the power efficiency of electronic devices.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
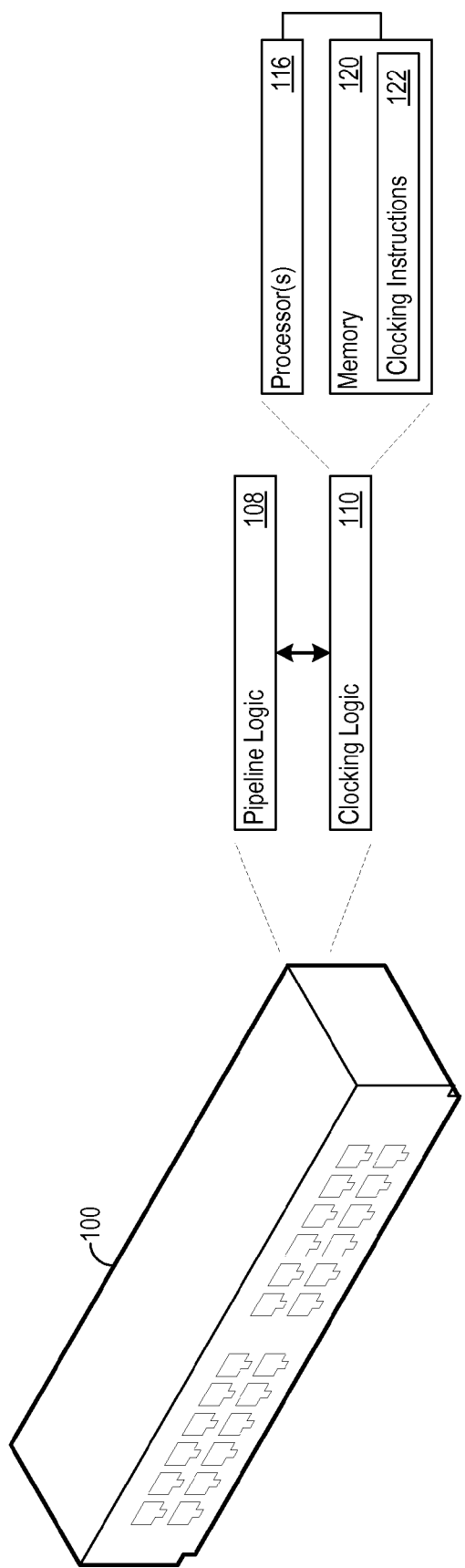
FIG. 1 shows an example of a device which performs dynamic clock gating.

FIG. 1 shows an example of a device 100 which performs dynamic clock gating. The device 100 is a network switching device, in this example, but the device 100 may take any form. The network switching device may be one that communicates data according to any number of communication protocols, such as Ethernet, Digital Subscriber Line (DSL), Integrated Services Digital Network (ISDN), Fiber Distributed Data Interface (FDDI), and other protocols. As examples, the device 100 may include a switch, hub, router, gateway, network bridge, or any other type of network device that processes or routes network data such as packets.

The device 100 may include processing circuitry for any number of purposes, including the pipeline logic 108 depicted in FIG. 1. The pipeline logic 108 may implement a processing pipeline, which may include any number of elements or circuitry for processing data. For example, the pipeline logic 108 may include any number of queues, processing logic or circuitry, synchronous or asynchronous logic, combination logic, registers, flip-flops, multiplexers, combinational logic, buses, arithmetic logic units (ALUs), or other elements. The pipeline logic 108 may also be part of any number of processing datapaths. For instance, in a switching device, the pipeline logic 108 may be part of an ingress datapath, egress datapath, or others. In a switch device, the pipeline logic 108 may process received network data, switched network data, or other network data.

The pipeline logic 108 may be divided into any number of pipeline stages. A pipeline stage may refer to one or more elements of the pipeline logic 108 that perform one or more predetermined operations. A pipeline stage may also refer to a particular processing step performed by the pipeline logic 108. For example, a Reduced Instruction Set Architecture (RISC) processing pipeline may include an instruction fetch stage, decode stage, execute stage, memory access stage, writeback stage, or other stages. A switch pipeline may include any number of stages operating on network data (e.g., a packet, any portion of a packet, data associated with a packet, etc.), such as a Multiprotocol Label Switching (MPLS) stage, a layer 2 (L2) processing stage, a layer 3 (L3) processing stage, a packet arbitration stage, a packet parsing stage, a switch bitmap resolution stage, and others.

In addition to the pipeline logic 108, the exemplary device 100 shown in FIG. 1 also includes clocking logic 110, which may be in communication with any of the elements in the pipeline logic 108. In one implementation, the clocking logic 110 may include one or more processors 116 and a memory 120. The memory 120 may store clocking instructions 122. As described in greater detail below, the clocking logic 110 may perform dynamically gate any number of clock signals sent to the pipeline logic 108. For example, the clocking logic 110 may independently provide a respective clock to different sub-stages within a particular pipeline stage of the pipeline logic 108. The clocking logic 110 may determine an active time at which data is to be processed by a pipeline sub-stage and send a clock to the pipeline sub-stage based on the active time. As one example, in a switching device, the clocking logic 110 may determine an active time when network data is to be processed by a selected switch pipeline sub-stage within a switch pipeline stage. The clocking logic 110 may then send a clock to the selected switch pipeline sub-stage based on the determined active time.

Figure 2:
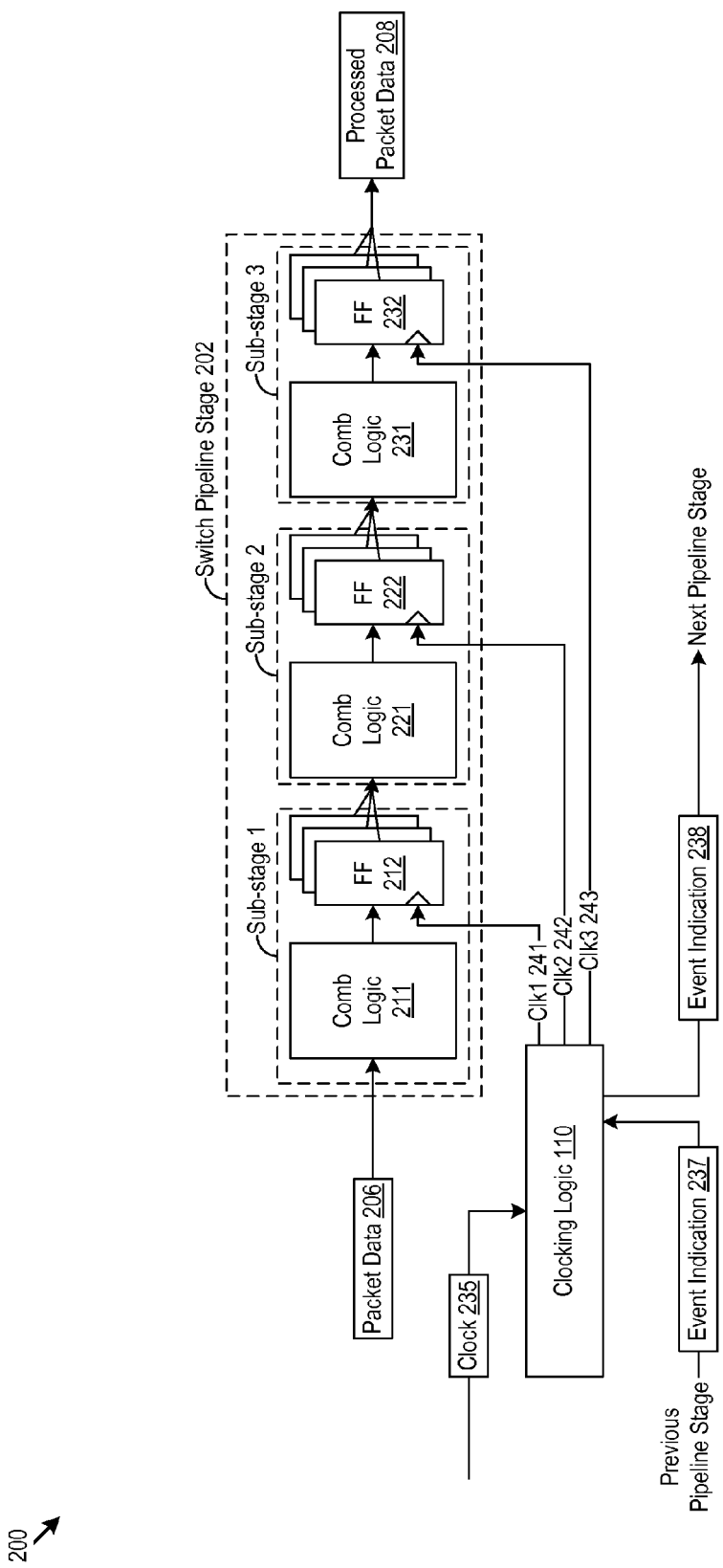
FIG. 2 shows an example of system for dynamic clock gating in a pipeline stage.

FIG. 2 shows an example of system 200 for dynamic clock gating in a pipeline stage. The system 200 may include a pipeline stage of any form, such as the exemplary switch pipeline stage 202 shown in FIG. 2. The switch pipeline stage 202 may receive packet data 206 from various sources, such as a previous switch pipeline stage, datapath queue, memory, one or more registers, data port, switching fabric, or other sources. The switch pipeline stage 202 may process the packet data 206 to obtain processed packet data 208. Then, the switch pipeline stage 202 may send the processed packet data 208 to any number of destinations, such as a subsequent switch pipeline stage, datapath queue, memory or register, data port, switching fabric, or other destinations.

The packet data 206 may take any number of forms. The packet data 206 may include data obtained from a network packet, data associated with the network packet, or both. For example, the packet data 206 may include start of packet (SOP) data, middle of packet (MOP) data, end of packet data (EOP), or any combination thereof.

A pipeline stage may be categorized into any number of pipeline sub-stages within the pipeline stage. In the example shown in FIG. 2, the switch pipeline stage 202 may be categorized into the three pipeline sub-stages labeled as sub-stage 1, sub-stage 2, and sub-stage 3. The sub-stage categorization of a pipeline stage may be implemented in any number of ways. For example, the clocking logic 110 may be preconfigured to recognize a selected portion of the switch pipeline stage 202 as a sub-stage. Or, the switch pipeline stage 202 may be divided according to a user input, processing latency, number of inputs, circuitry location, processing tasks or sub-tasks, or in any number of other ways. In one implementation, the switch pipeline stage 202 is categorized into a number of sub-stages such that each pipeline sub-stage has a processing latency of one clock cycle.

The system 200 shown in FIG. 2 also includes the clocking logic 110, which may be associated with the switch pipeline stage 202. The clocking logic 110 may recognize pipeline sub-stages within the switch pipeline stage 202. Each of the sub-stages 1, 2, and 3 shown in FIG. 2 may include processing logic or circuitry, such as synchronous or asynchronous logic, combination logic, registers, flip-flops, multiplexers, combinational logic, buses, arithmetic logic units (ALUs), and more. Memory elements in the sub-stage, such as registers, flip-flops, or others, may store data generated in the sub-stage. In the example shown in FIG. 2, sub-stage 1 of the switch pipeline stage 202 includes combinational logic 211 and one or more flip-flops 212. The flip-flops 212 may receive data processed by the combinational logic 211 and store the data processed by the combinational logic 211 at a particular time, e.g., at a rising edge of a clock. Sub-stage 2 may include the combinational logic 221 and flip-flops 222 and sub-stage 3 may include the combinational logic 231 and flip-flops 232.

A pipeline stage, sub-stage, or a portion of a sub-stage may be characterized by a processing latency. The processing latency may be identified as a number of clock cycles (e.g., according to a system clock or global clock) to complete a processing task, execution time to complete a processing task, or in other ways. As one example, a pipeline stage may have a latency of three clock cycles when the pipeline stage completes processing of the data that was input to the pipeline stage after three clock cycles. Similarly, a pipeline sub-stage or portion of a pipeline sub-stage may complete processing of the data within a particular number of clock cycles, e.g., the processing latency of the pipeline sub-stage or sub-stage portion. In the example shown in FIG. 2, the switch pipeline stage 202 may be characterized by a processing latency of three clock cycles, and each of the sub-stages 1, 2, and 3 or portions thereof (e.g., the combination logic 211, 212, or 213) may process packet data within a predetermined processing latency of one clock cycle.

The clocking logic 110 may also receive a clock signal 235, such as a free-running clock, a global clock, a system clock, or other clock signal. The clocking logic 110 may also receive an event indication 237, which may originate from a previous pipeline stage or other control logic in the device 100. The event indication 237 may provide an indication of when data will be sent to the switch pipeline stage 202. The event indication 237 may be implemented in any number of ways, such as through a control signal, a message, a register or memory change, or others.

The event indication 237 may provide an indication as to when the switch pipeline stage 202 will receive data, e.g., processed data from a previous pipeline stage, in any number of ways. For example, the event indication 237 may indicate the switch pipeline stage 202 will receive data at a predetermined time after the clocking logic 110 receives the event indication 237. Or, the previous pipeline stage may be configured to generate the event indication 237 when data in the previous pipeline stage reaches a predetermined position before completion of the prior pipeline stage. The predetermined position may include, as examples, a predetermined latency (e.g., clock cycles) prior to completion, start of a particular sub-stage, a predetermined time, sub-stage position, or other positions in the prior pipeline stage. In this way, receiving the event indication 237 may allow the clocking logic 110 to determine when the switch pipeline stage 202 will receive data processed by the previous pipeline stage. In FIG. 2, the clocking logic 110 may similarly generate and send an event indication 238 to a next pipeline stage when the packet data 206 reaches a predetermined position in the pipeline stage 202, e.g., 2 clock cycles before packet data 206 reaches the output of sub-stage 3.

The clocking logic 110 may generate and send an event indication to a next pipeline stage according to any number of events. As discussed above, the clocking logic may identify an event when the packet data 206, e.g., SOP data, MOP data, or EOP data, reaches a predetermined point in a pipeline sub-stage. The clocking logic 110 may also generate and send an event indication upon identifying a Refresh Ticks event, which may be an indication to refresh credits for event metering logic. A Refresh Ticks event may occur for a specified number of times in a specified time interval. The clocking logic 110 may also recognize as events a Time Ticks event, which may be used for logic or a pipeline sub-stage which requires a time reference, any CPU command, a packet injection event, or any other event associated with the network packet or processing of the network packet. Different pipeline stages and/or sub-stages may identify events, generate and send event indications, or process network data differently according to the particular functionality associated with the pipeline stage or sub-stage.

The clocking logic 110 may selectively and independently clock one or more pipeline sub-stages in a pipeline stage. The clocking logic 110 may independently send a respective clock signal that includes respective clock content to different pipeline sub-stages within the pipeline stage. As seen in FIG. 2, the clocking logic 110 sends a first clock signal labeled as clk1 241 to sub-stage 1, a second clock signal labeled as clk2 242 to sub-stage 2, and a third clock signal labeled as clk3 243 to sub-stage 3. At determined times, the clocking logic 110 may send an active clock signal to a pipeline sub-stage, such as a clock signal including one or more clock pulses, clock cycles, or transitions. At other times, the clocking logic 110 may send an inactive clock signal to the pipeline sub-stage, such as a clock signal with no clock pulse or transitions. In this way, the clocking logic 110 may adapt the clock content of any clock signal to dynamically gate respective clock signals for pipeline sub-stages, which may reduce dynamic power dissipation in the pipeline stage, e.g., power dissipation resulting from a register, flip-flop, or other memory state change.

The clocking logic 110 may selectively clock a pipeline sub-stage in any number of ways. For example, the clocking logic 110 may determine a clocking time to issue a clock, e.g., active clock signal, to a selected pipeline sub-stage. The clocking logic 110 may determine a clocking time that takes into consideration processing latency of any number of prior pipeline sub-stages, including, as examples, a prior pipeline sub-stage from the current pipeline stage, a prior pipeline sub-stage from a previous pipeline stage, or both. The clocking logic 110 may also determine a clocking time for any number of pipeline sub-stages in response to receiving an event indication 237 that provides an indication of when the pipeline stage 202 will receive data to process.

The clocking logic 110 may send a clock signal to any portion of a pipeline sub-stage. In one implementation, a pipeline sub-stage may include a processing portion that includes processing elements, e.g., logic, to generate result data for a sub-stage. The pipeline sub-stage may also include a memory portion that includes memory elements, e.g., flip-flops or registers, to store the result data generated during the sub-stage. As one example seen in FIG. 2, the clocking logic 110 may send a clock signal to a memory portion of a pipeline sub-stage, such as the flip-flops 212, 222, or 232. In one implementation, the clocking logic 110 may send an active clock pulse to a memory portion of a pipeline sub-stage (e.g., flip-flops) when required for processing and otherwise gate the clock signal to the memory portion to conserve power.

To selectively clock a selected sub-stage within the switch pipeline stage 202, the clocking logic 110 may determine an active time at which packet data is to be processed in the pipeline sub-stage. Then, the clocking logic 110 may send a clock comprising a clock cycle to the selected pipeline sub-stage, or the memory portion of the selected pipeline sub-stage, based on the active time. For example, the clocking logic 110 may determine the active time to be when packet data will be processed by a processing portion of a particular sub-stage, e.g., when the combinational logic 221 of sub-stage 2 will process received packet data. After the active time, the clocking logic 110 may send an active clock signal to the sub-stage or a portion of the sub-stage, e.g., the flip-flops 222 of sub-stage 2. Upon receiving the clock, the flip-flops 222 to sample the result data generated by the combinational logic 221 of sub-stage 2. After sampling the result data and after an associated propagation delay, the flip-flops 222 may also provide the result data generated during sub-stage 2 to sub-stage 3, for processing by the combinational logic 231 of sub-stage 3.

In one implementation, the clocking logic 110 may include one or more clock gating cells to generate respective clock signals for sub-stages within a pipeline stage. A clock gating cell may receive an enable signal and generate a clock pulse in response. In this implementation, the clocking logic 110 may also include control logic to generate enable signaling sent to the clock gating cells, e.g., based on determined clocking times or active times. The clocking logic 110 may include a clock gating cell for each sub-stage within a pipeline stage. For example, in FIG. 2, the clocking logic 110 may include three clock gating cells, one for each of the sub-stages 1, 2, and 3. The three clock gating cells may respectively generate and send clocks to sub-stages 1, 2, and 3 through the signals clk1 241, clk2 242, and clk3 243 respectively.

Figure 3:
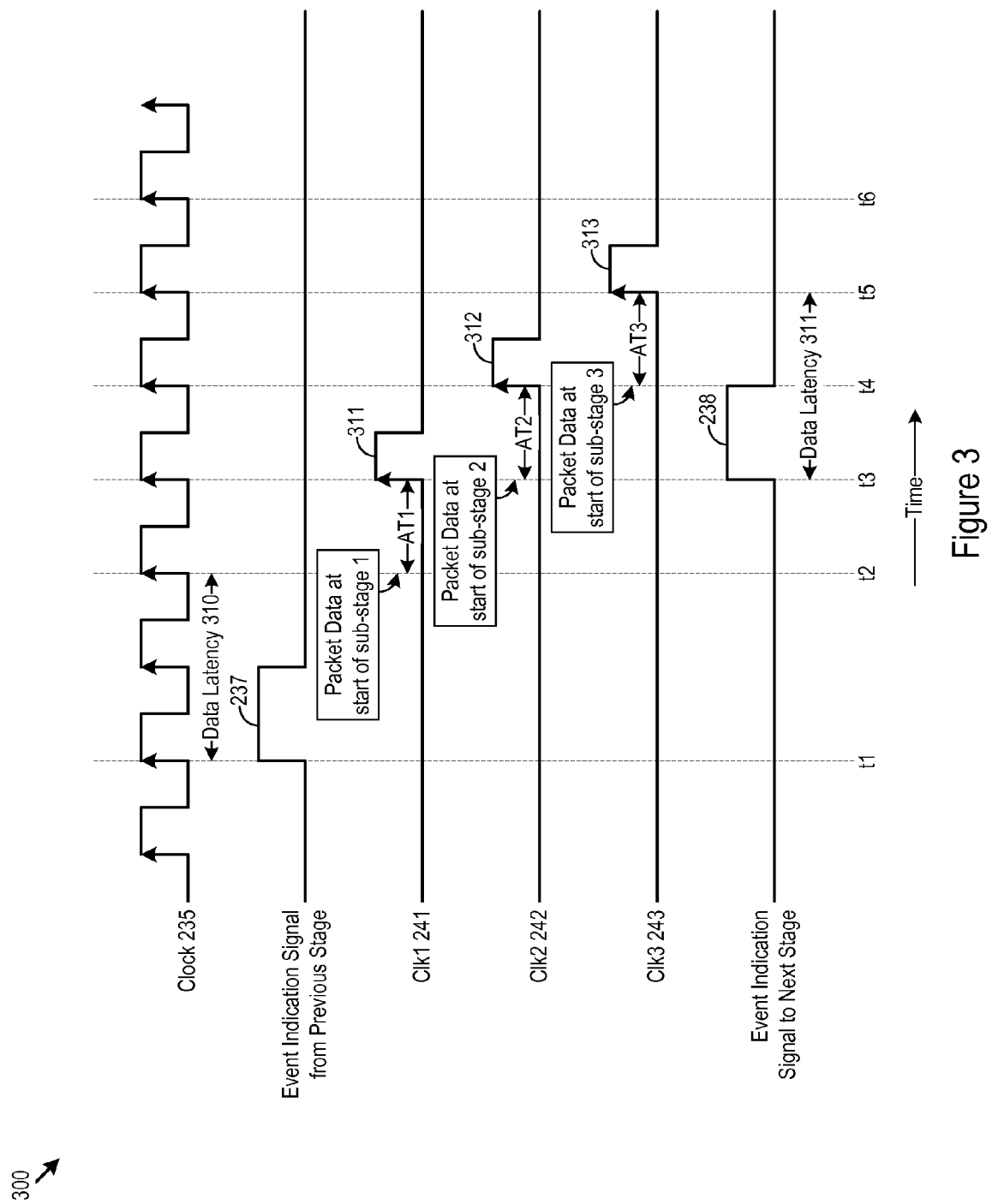
FIG. 3 shows a timing example of dynamic clock gating in a pipeline stage.

FIG. 3 shows a timing example 300 of dynamic clock gating in a pipeline stage. The timing example 300 shown in FIG. 3 may depict one example of clock timing for when packet data 206 flows through the switch pipeline stage 202 shown in FIG. 2, which includes sub-stages 1, 2, and 3. The timing example 300 includes signals the clocking logic 110 may receive, such as the clock 235 and an event indication signal from a previous pipeline stage. In the timing example 300, the event indication signal may be implemented as a control signal with a high and low state. The clocking logic 110 may recognize an event indication 237 from the previous pipeline stage when the event indication signal is in a high state for a given clock cycle. The timing example 300 also includes signals the clocking logic 110 may send, such as the clock signals clk1 241, clk2 242, and clk3 243, as well as the event indication signal to a next pipeline stage.

At time t1, the clocking logic 110 may receive an event indication 237 from a previous pipeline stage in communication with the pipeline stage 202. As discussed above, the event indication 237 may provide a timing indication as to when the switch pipeline stage 202 will receive the packet data 206, which may be processed data from a previous pipeline stage.

In the timing example 300, the clocking logic 110 may determine that the pipeline stage 202 will the packet data 206 will reach the start of the switch pipeline stage 202 at a predetermined data latency after first receiving the event indication 237, e.g., two clock cycles after receiving the event indication 237, as seen by the data latency 310 shown in FIG. 3. As seen in the timing example 300, the clocking logic 100 may first receive the event indication 237 at a time t1 and the pipeline stage 202 may receive the packet data 206 two clock cycles later at time t2.

Time t2 may also depict when the first sub-stage of the switch pipeline stage 202 receives the packet data 206, for example sub-stage 1 from FIG. 2. In response to receiving the event indication 237, the clocking logic 110 may determine when the packet data 206 is to be processed by sub-stage 1 and generate a clock accordingly. In FIG. 3, the clocking logic 110 may determine an active time from time t2 to t3 during which the packet data 206 may be processed by sub-stage 1 of the switch pipeline stage 202. Then, at time t3, the clocking logic 110 may send a first clock 311 to the first sub-stage through clock signal clk1 241, which may include a clock pulse. The clocking logic 110 may send the first clock 311 to a memory portion of sub-stage 1 to sample, e.g., store, result data generated during sub-stage 1. Upon sampling the result data from sub-stage 1, the memory portion, e.g., flip-flops 212, may provide the result data to a next sub-stage for subsequent processing. As seen in FIG. 3, the packet data (processed by sub-stage 1) may reach the start of sub-stage 2 at or around time t3, which may vary depending on the propagation delay of the flip-flops 212.

Independently from sending the clock to sub-stage 1, the clocking logic 110 may send a second clock 312 to sub-stage 2 through clock signal clk2 242. In response to receiving the event indication 237, the clocking logic 110 may determine a clocking time or active time for sub-stage 2 by taking into consideration the processing latency of sub-stage 1. That is, the clocking logic 110 may recognize that sub-stage 1 has a processing latency of 1 clock cycle. The clocking logic 110 may also identify that sub-stage 2 also has a processing latency of 1 clock cycle. Then, the clocking logic 110 may an active time for sub-stage 2 from time t3 to t4, a time of one clock cycle matching the processing latency of sub-stage 2, and one cycle after the active time of sub-stage 1. Accordingly, the clocking logic 110 may send a second clock 312 to the flip-flops 222 of the second sub-stage after the determined active time, e.g., at time t4. When a sub-stage has a processing latency of multiple clock cycles, the clocking logic 110 may also send a clock to the sub-stage during the active time as well.

In a similar way, the clocking logic 110 may send a third clock 313 to sub-stage 3 independently from sending the clocks 311 and 312 to sub-stages 1 and 2 respectively. The clocking logic 110 may determine a clocking time or active time of sub-stage 3 by taking into consideration the processing latencies of previous sub-stages 1 and 2. Then, the clocking logic 110 may generate and send the third clock 313 to sub-stage 3, e.g., the flip-flops 232, allowing the flip-flops 232 to store result data generated by the combinational logic 231 during sub-stage 3. In the example seen in FIG. 3, the clocking logic 110 may perform dynamic clock gating on a per-cycle basis.

In the timing example 300, the clocks 311, 312, and 313 each include one active pulse and one clock cycle comprising a 50% duty cycle that may be similar in frequency to a system clock, e.g., the clock 235. However, the clocking logic 110 may send a clock to a pipeline sub-stage of any form. For example, the clock may include any number number of active clock pulses or clock cycles, e.g., based on the processing latency of a particular sub-stage. The clock may also include any number of characteristics. For example, the clocking logic 110 may determine the characteristics of a clock to match or mirror any number of characteristics of a clock signal 235, such as free running clock or global clock that may the clocking logic 110 may receive. Additionally, the clock may take any number of forms, and vary in any way based on clock frequency, length, timing, duty cycle, or other characteristics.

The clocking logic 110 may also generate an event indication 238 to send to a next pipeline stage, such as a pipeline stage directly or indirectly subsequent to the switch pipeline stage 202. The clocking logic 110 may generate and send the event indication 238 at a predetermined position before processing of the packet data 206 completes in the switch pipeline stage 202. In FIG. 3, the clocking logic 110 is configured to send the event indication 238 two clock cycles prior to completion of the switch pipeline stage 202. The switch pipeline stage 202 may complete after processing of packet data by sub-stage 3, e.g., when the flip-flops 232 sample and provide the processed packet data 208. Thus, the clocking logic 110 may determine when packet data will reach the start of sub-stage 2, which may be two clock cycles prior to completion of the switch pipeline stage 202. Thus, at time t3 when the packet data reaches the start of sub-stage 2, the clocking logic 110 may generate and send the event indication 238 to the next pipeline stage. In one implementation, the clocking logic 110 may send the event indication 238 to different clocking logic associated with the next pipeline stage.

As each of the sub-stages in the switch pipeline 202 from FIG. 2 has a processing latency of a single clock cycle, the clocking logic 110 may selectively clock the sub-stages by independently providing a clock including a single pulse to each of the sub-stages. Thus, as the packet data 206 flows through the pipeline stage 202, the clocking logic 110 provides a respective clock including a single clock pulse for each set of flip-flops 212, 222, and 232 to store result data processed by the respective sub-stage. In this way, the clocking logic 110 may reduce dynamic power dissipation as the pipeline stage 202 processes network data. In one implementation, the clocking logic 110 may dynamically clock sub-stages within a switch pipeline stage 202 such that potential or actual power savings, e.g., reduction of power dissipation in a switch pipeline stage 202, scale proportionally with the amount of network data processed by the switch pipeline stage 202. The clocking logic 110 may also dynamically clock sub-stages within the switch pipeline stage 202 such that potential or actual power savings occur independent of packet latency, e.g., latency between receiving or sending packets in a switch device or latency between processing of packet data in the switch pipeline stage 202.

Figure 4:
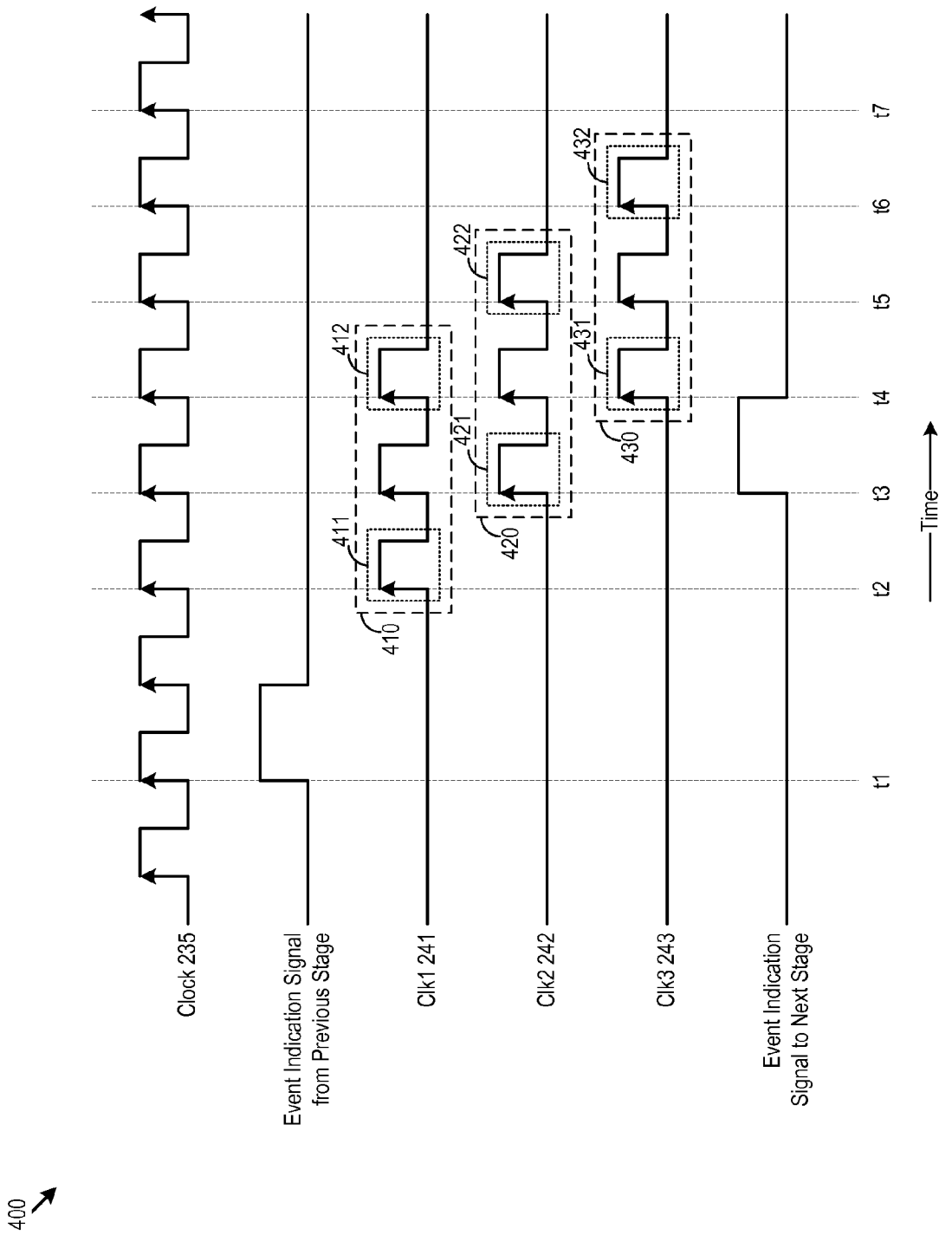
FIG. 4 shows a timing example of dynamic clock gating in a pipeline stage.

FIG. 4 shows a timing example 400 of dynamic clock gating in a pipeline stage. The timing example 400 shown in FIG. 4 may depict an example of clocking timing for when packet data 206 flows through the pipeline stage 202 shown in FIG. 2, which includes sub-stages 1, 2, and 3. The timing example 400 includes signals the clocking logic 110 may receive, such as the clock 235 and the event indication signal from a previous pipeline stage. The timing example 400 also includes signals the clocking logic 110 may send, such as the clock signals clk1 241, clk2 242, and clk3 243, as well as the event indication signal to a next pipeline stage.

In the switch pipeline stage 202 from FIG. 2, the sub-stages 1, 2, and 3 may each have a processing latency of one clock cycle. As seen in the timing example 300 from FIG. 3, the clocking logic 110 may independently send a clock that includes one clock pulse to each of the sub-stages 1, 2, and 3 after packet data has been processed in each of the respective pipeline sub-stages. The clocking logic 110 may determine additional clock content to send to a pipeline sub-stage as well. For example, the clocking logic 110 may send a clock to a selected pipeline sub-stage that includes a number of clock pulses or clock cycles consistent with the processing latency, e.g., number of cycles, of a pipeline sub-stage and additional content as well. The additional clock content may include any number of additional clock cycles or clock pulses before or after data is processed through a pipeline sub-stage.

As seen in the timing example 400 in FIG. 4, the clocking logic 110 generates clocks 410, 420, and 430 that each include 3 clock cycles. The clocking logic 110 may send the clock 410 through clock signal clk1 241 to sub-stage 1 of the pipeline stage 202. As seen in timing example 400, the content of clock 410 includes three clock pulses and three clock cycles even though sub-stage 1 has a processing latency of one clock cycle. Specifically, clock 410 includes the leading clock pulse 411 that occurs one cycle prior to packet data reaching the flip-flops 212 and the trailing clock pulse 412 that occurs after the packet data has been sampled, e.g., latched, by the flip-flops 212.

The clocking logic 110 may send a clock that includes one or more leading clock pulses. A leading clock pulse may be implemented an additional clock pulse before packet data reaches a set of flip-flops for a pipeline sub-stage, the leading clock pulses 411, 421, or 431. In this way, the clocking logic may ensure the clock signal to a particular pipeline sub-stage is active when packet data reaches the memory portion of the sub-stage. The clocking logic 110 may also send a clock that includes one or more trailing clock pulses. A trailing clock pulse may be implemented as an additional clock pulse after packet data processed by a sub-stage is sampled and provided to a next sub-stage, e.g., the trailing clock pulses 412, 422, or 432. Doing so may allow additional control logic or other logic to perform a reset action, such as resetting the output of sub-stage flip-flops that the packet data has passed through to a predetermined value.

Figure 5:
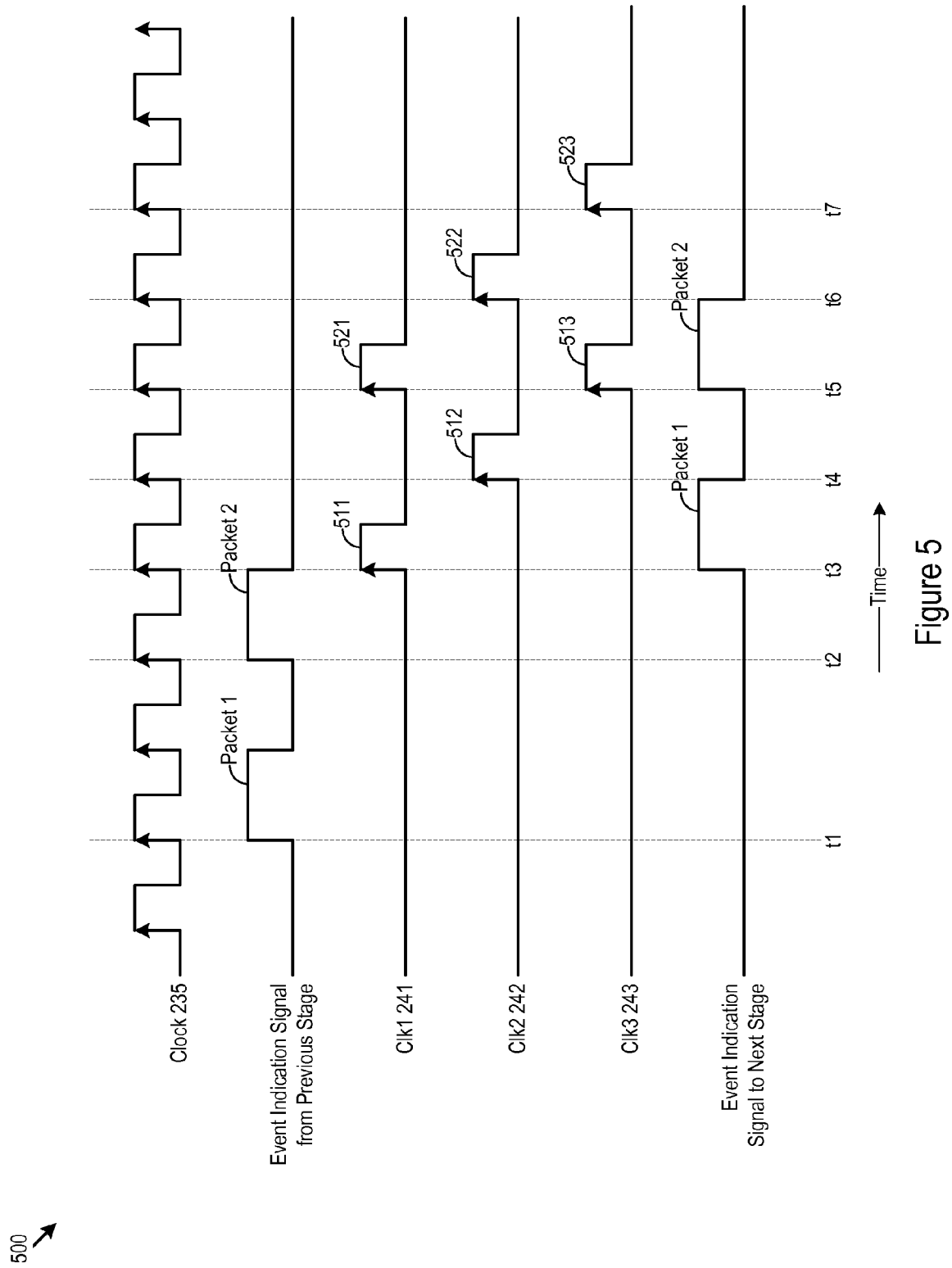
FIG. 5 shows a timing example 500 of dynamic clock gating when multiple packets are processed in a pipeline stage.

FIG. 5 shows a timing example 500 of dynamic clock gating when multiple packets are processed in a pipeline stage. The timing example 500 shown in FIG. 5 may depict an example of clocking timing when data from multiple packets flows through the switch pipeline stage 202 shown in FIG. 2, which includes sub-stages 1, 2, and 3. The timing example 500 includes signals the clocking logic 110 may receive, such as the clock 235 and an event indication signal from a previous pipeline stage. The timing example 400 also includes signals the clocking logic 110 may send, such as the clock signals clk1 241, clk2 242, and clk3 243 as well as an event indication signal sent to a next pipeline stage.

At time t1, the clocking logic 110 may identify a first event indication from a previous pipeline stage, which may be responsive to processing and sending of first packet data by the previous pipeline stage to the switch pipeline stage 202. In response, the clocking logic 110 may independently generate a respective clock for sub-stages 1, 2, and 3 of the pipeline stage 202 to process packet data associated with the first network packet. As seen in FIG. 5, the clocking logic 110 may generate a clock 511 for sub-stage 1 that includes a clock pulse starting at time t3. The clocking logic 110 may also send a clock 512 that includes a clock pulse for sub-stage 2 starting at time t4 as well as a clock 513 that includes a clock pulse for sub-stage 3 starting at time t5. The clocking logic 110 may determine a clocking time, active time, clock content, or any combination thereof in any manner as described above. The clocks 511, 512, and 513 may be sent to a memory portion, e.g., flip-flops, of each respective sub-stage to store result data associated with the first packet generated during each respective sub-stage.

At time t2, two clock cycles after time t1, the clocking logic 110 may receive a second event indication from a previous pipeline stage, which may be responsive to processing and sending of second packet data by the previous pipeline stage to the switch pipeline stage 202. In response, the clocking logic 110 may independently generate a respective clock for sub-stages 1, 2, and 3 of the pipeline stage 202 to process the packet data associated with the second packet. As seen in FIG. 5, the clocking logic 110 may generate the clocks 521, 522, and 523 for sub-stages 1, 2, and 3 respectively. The clocks 521, 522, and 523 may be sent to a memory portion, e.g., flip-flops, of each respective sub-stage to store result data associated with the second packet generated during the respective sub-stage.

The clocking logic 110 may selectively clock a sub-stage to preserve packet latency, e.g., latency between receiving or sending packets in a switch device or latency between processing of packet data in the switch pipeline stage 202. For example, in the time example 500, the clocking logic 110 may receive the first event indication corresponding to a first packet at time t1 and a second event indication corresponding to a second packet two clock cycles later at time t2. For a selected sub-stage, the clocking logic 110 may determine a first clocking time with respect to the first packet data and a second clocking time with respect to the second packet that data are two clock cycles apart, thus preserving packet latency.

As seen in FIG. 5, the clocking logic 110 may send the clock 511 to the flip-flops 212 at time t3 for sampling result data generated in the first sub-stage with respect to packet data from the first packet. Two clock cycles later at time t5, the clocking logic 110 may send the clock 521 to the flip-flops 212 for sampling result data generated in the first sub-stage with respect to packet data from the second packet. In the same way, the clocking logic 110 may preserve packet latency during processing in sub-stages 2 and 3 by sending the clocks 522 and 532 two cycles after sending the clock pulses 512 and 513 respectively. Similarly, the clocking logic 110 may generate and send event indications with respect to the first and second packet to the next pipeline stage at a timing of two cycles apart as well.

Figure 6:
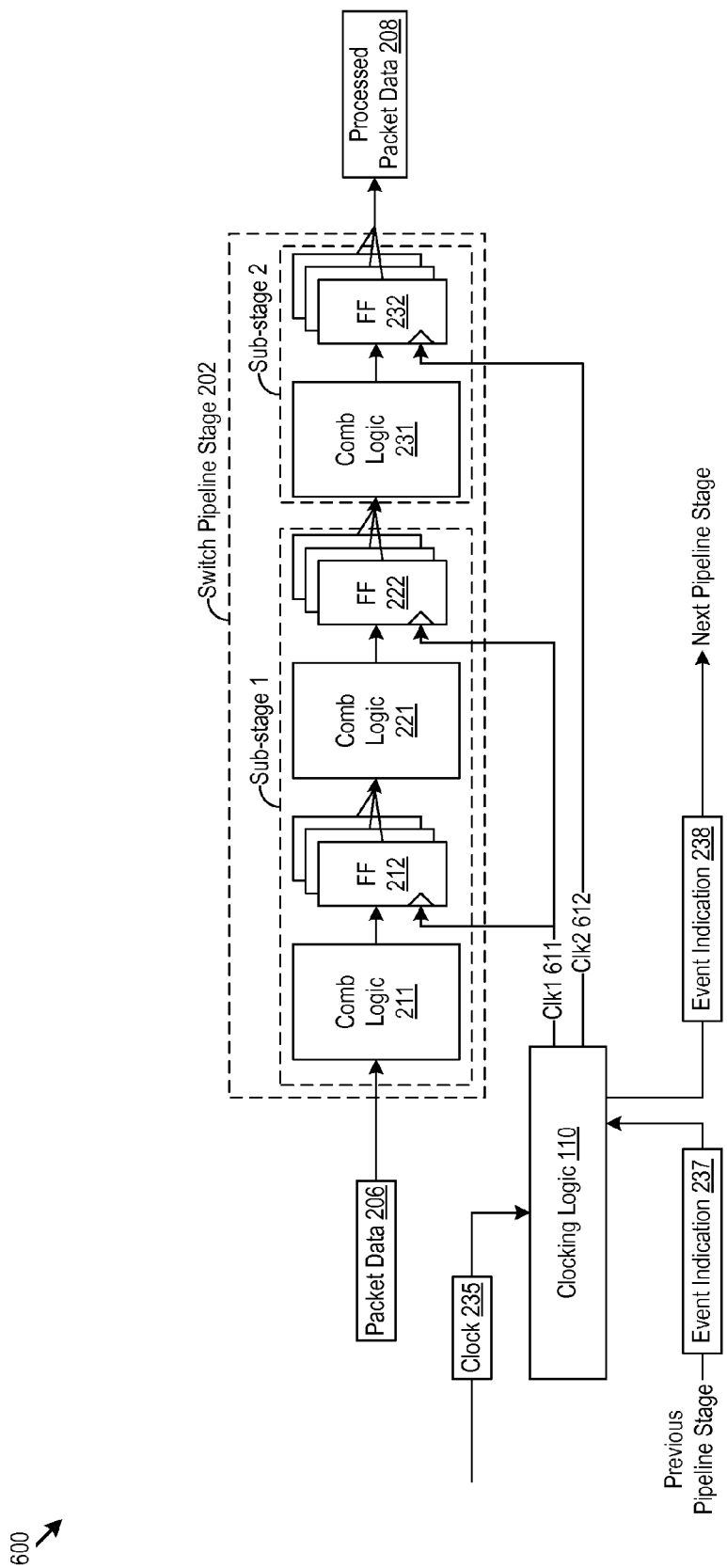
FIG. 6 shows an example of system for dynamic clock gating in a pipeline stage.

FIG. 6 shows an example of system 600 for dynamic clock gating in a pipeline stage. FIG. 6 shows two pipeline stages: sub-stage 1 and sub-stage 2. Sub-stage 1 of FIG. 6 includes the combination logic 211, the flip-flops 212, the combinational logic 221, and the flip-flops 222. In this example, sub-stage 1 has a processing latency of 2 clock cycles. Sub-stage 2 includes the combinational logic 231 and the flip-flops 232, and has a processing latency of 1 clock cycle.

The clocking logic 110 may selectively clock sub-stages 1 and 2 of the system 600 in any of the ways discussed above. The clocking logic 110 may provide a first clock signal to sub-stage 1 through the clock signal labeled clk1 611. The clocking logic 110 may provide the clock signal clk1 611 to the flip-flops 212 and the flip-flops 212. The clocking logic 110 may also provide a clock signal to sub-stage 2 through the clock signal labeled clk2 612, e.g., independent from the clock signal clk1 611 sent to sub-stage 1. Thus, a sub-stage may have multiple memory portions, e.g., sets of flip-flops, and be characterized by a processing latency of multiple clock cycles. The clocking logic 110 may accordingly determine a clocking time and clock content for multiple cycle sub-stages.

Figure 7:
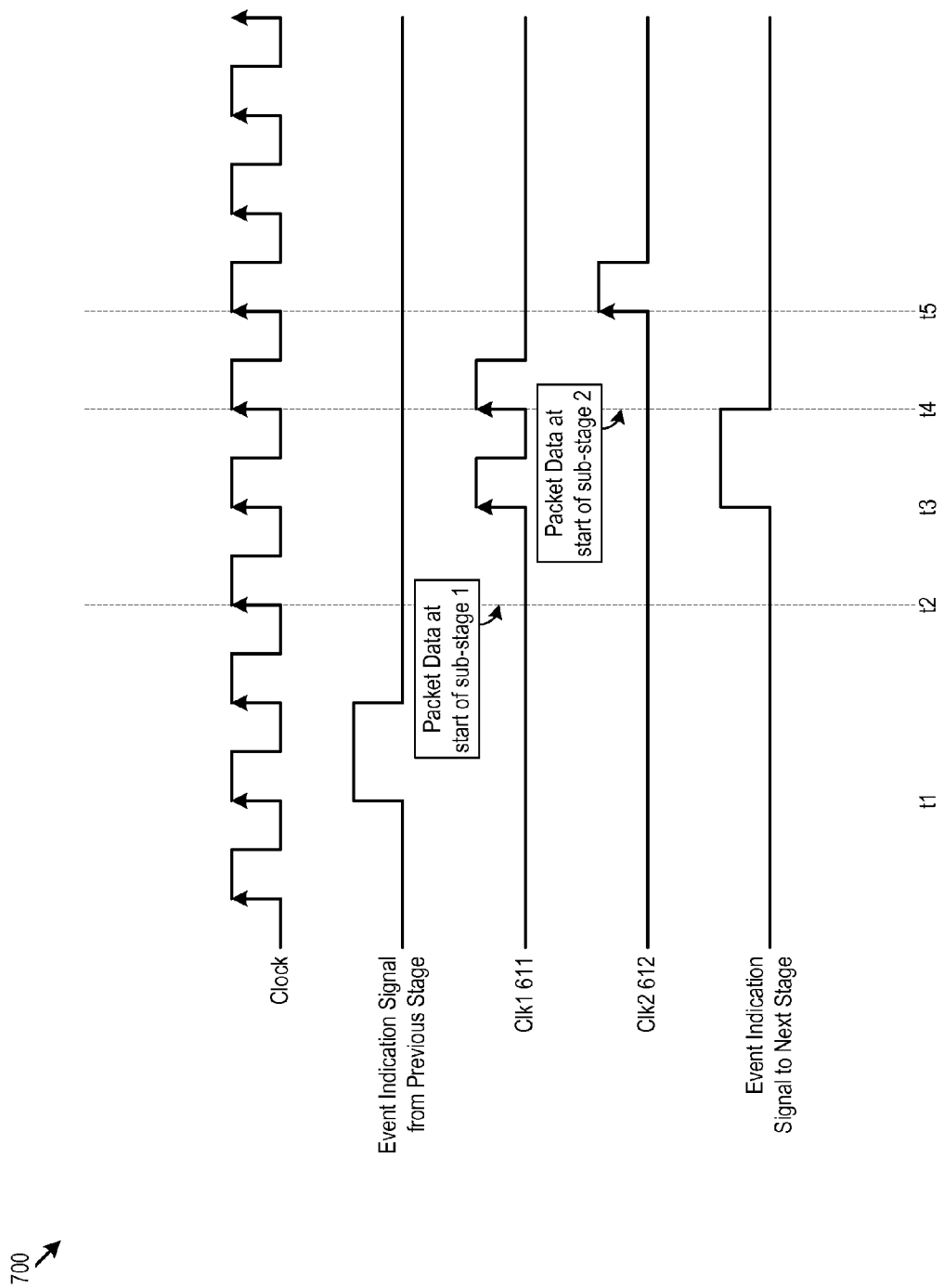
FIG. 7 shows a timing example of dynamic clock gating in a pipeline stage.

FIG. 7 shows a timing example 700 of dynamic clock gating in a pipeline stage. The timing example 700 shown in FIG. 7 may depict one example of clocking timing for when packet data 206 flows through the switch pipeline stage 202 shown in FIG. 6, which includes sub-stages 1 and 2. The timing example 700 includes signals the clocking logic 110 may receive, such as the clock 235 and the event indication signal from a previous pipeline stage. The timing example 700 also includes signals the clocking logic 110 may send, such as the clock signals clk1 241, clk2 242, and clk3 243, as well as the event indication signal to a next pipeline stage.

At time t1, the clocking logic 110 may identify an event indication 237 from a previous pipeline stage. In response, the clocking logic 110 may determine a first clocking time when network data will be processed by sub-stage 1. For example, the clocking logic 110 may determine the clocking time to be when packet data reaches a memory portion of sub-stage 1. In this example, the clocking logic 110 may determine that result data generated by the combinational logic 211 of sub-stage 1 will reach the flip-flops 212 by time t3. The clocking logic 110 may also determine that result data generated by the combinational logic 221 of sub-stage 1 will reach the flip-flops 222 by time t4. As such, the clocking logic 110 may determine the first clocking time to include a t3 and t4, and issue a clock that includes a clock pulse at times t3 and t4 through clock signal clk1 611.

The clocking logic 110 may determine a second clocking time when network data will be processed by sub-stage 2. The clocking logic 110 may take into consideration the processing latency of sub-stage 1 (e.g., 2 clock cycles) when determining the second clocking time for sub-stage 2. Thus, the clocking logic 110 may determine that the packet data may reach the start of sub-stage 2 (e.g., reach the combinational logic 231) at time t4, or shortly thereafter based on the propagation delay of the flip-flops 222. The clocking logic 110 may also determine that result data generated by the combination logic 231 of sub-stage 2 will reach the flip-flops 232 by time t5. Accordingly, the clocking logic 110 may determine the second clocking time to include a t5, and issue a clock that includes an active clock pulse at time t5 through the clock signal clk2 615.

Figure 8:
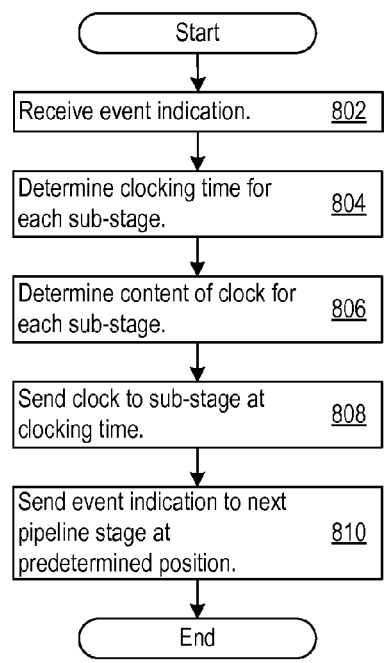
FIG. 8 shows an example of logic that a device may implement as hardware, software, or both.

FIG. 8 shows an example of logic 800 that a device 100 may implement as hardware, software, or both. For example, the clocking logic 110 may implement the logic 800 to selectively clock any number of sub-stages in a pipeline stage, such as the switch pipeline stage 202. The clocking logic 110 may receive an event indication (802), such as from a prior pipeline stage in communication with the pipeline stage. The event indication may indicate when the pipeline stage will receive data to process through the pipeline stage. In response, the clocking logic 110 may selectively clock sub-stages within the pipeline stage, e.g., clocking a sub-stage at selected times when the data passes through each sub-stage.

The clocking logic 110 may determine a respective clocking time for one or more sub-stages within a pipeline stage (804). In determining the clocking time for a particular pipeline sub-stage, the clocking logic 110 may take into account the processing latency of any number of other pipeline sub-stages, such as any number of sub-stages prior to the particular pipeline sub-stage. The clocking logic 110 may also determine a clocking time by identifying when data is to be processed by any portion of the pipeline sub-stage, e.g., when result data generated in the sub-stage can stored in a memory portion of the sub-stage. For example, in the switching pipeline stage 202 discussed above, the clocking logic 110 may determine the clocking time for a particular sub-stage to include when result data processed by combinational logic in the sub-stage reaches one or more flip-flops configured to sample the result data.

The clocking logic 110 may also determine the content of a clock sent to one or more sub-stages of the pipeline stage (806). As an example, the clocking logic 110 may determine a number of clock pulses to send to the pipeline sub-stage, which may be based on the processing latency of a particular sub-stage. In one implementation, the clocking logic 110 may determine the content to the clock to include at least a number of clock cycles as the clock cycle processing latency of particular sub-stage. The clocking logic 110 may also determine whether to send any number of additional clock pulses or cycles, either before data is processed in the sub-stage or after data is processed in the sub-stage, as discussed in FIG. 4 above. The clocking logic 110 may also determine any number of characteristics of the clock sent to the particular sub-stage. For example, the clocking logic 110 may determine the characteristics of a clock to match or mirror any number of characteristics of a free running clock, system clock, or global clock that may the clocking logic 110 may receive, such as the clock 235. Additionally, the clock content may take any number of forms, and vary in any way based on clock frequency, length, timing, duty cycle, or other characteristics.

For the determined clocking time of a particular sub-stage, the clocking logic 110 may send the clock to the sub-stage (808). The clocking logic 110 may also generate and send an event indication (810) when data, e.g., packet data associated with the received event indication, reaches a predetermined position in the pipeline stage. For example, the clocking logic 110 may send an event indication to a next pipeline stage subsequent to the current pipeline stage at a predetermined number of clock cycles before the pipeline stage completes processing data in the pipeline stage. Thus, the clocking logic 100 may perform dynamic clock gating in pipeline stage of a device 100, such as a switch device.

The exemplary device 100 described in FIG. 1 above pertained to a network switch device. However, the device 100 may take on any number of forms. As additional examples, the device 100 may be a laptop, desktop, or other type of computer, a personal data assistant, or a portable email device. Additional examples of devices 100 include televisions, stereo equipment such as amplifiers, pre-amplifiers, and tuners, home media devices such as compact disc (CD)/digital versatile disc (DVD) players, portable MP3 players, high definition (e.g., Blu-Ray™ or DVD audio) media players, or home media servers. Other examples of devices 100 include vehicles such as cars and planes, societal infrastructure such as power plants, traffic monitoring and control systems, or radio and television broadcasting systems. Further examples include home climate control systems, washing machines, refrigerators and freezers, dishwashers, intrusion alarms, audio/video surveillance or security equipment, network attached storage, and network routers and gateways. The devices may be found in virtually any context, including the home, business, public spaces, or automobile. Thus, as additional examples, the devices may further include automobile engine controllers, audio head ends or DVD players, satellite music transceivers, noise cancellation systems, voice recognition systems, climate control systems, navigation systems, alarm systems, or other devices.

The clocking logic 110 described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A device comprising:
a first switch pipeline stage comprising a first sub-stage preceding a second sub-stage;
first sub-stage processing circuitry in the first sub-stage;
second sub-stage processing circuitry in the second sub-stage; and
clocking circuitry associated with the first switch pipeline stage, the clocking circuitry configured to:
receive an event trigger from clocking circuitry for a previous switch pipeline stage, wherein the event trigger is indicative of packet data reaching a predetermined position in the previous pipeline stage; and in response to receiving the event trigger:
determine, from the event trigger received from the clocking circuitry for the previous switch pipeline stage, a future clocking time at which to issue a clock to the first sub-stage, second sub-stage, or both, within the first switch pipeline stage and
issue the clock at the future clocking time.

2. The device of claim 1, wherein the first switch pipeline stage is part of an ingress datapath in a network switching device.

3. The device of claim 1, wherein the first switch pipeline stage is part of an egress datapath in a network switching device.

4. The device of claim 1, wherein the first sub-stage processing circuitry comprises a flip-flop configured to store result data generated in the first sub-stage.

5. The device of claim 1, wherein the second sub-stage of the first switch pipeline stage is characterized by a predetermined processing latency, and wherein the clock causes the second sub-stage to process the packet data for the predetermined processing latency.

6. The device of claim 5, where the predetermined processing latency comprises a pre-determined number of clock cycles.

7. The device of claim 1, wherein the event trigger is further indicative of the packet data reaching a predetermined position prior to completion of the previous switch pipeline stage.

8. A device comprising:
a first switch pipeline stage for processing a network data;
a second switch pipeline stage in communication with the first switch pipeline stage, the second switch pipeline stage comprising:
a first pipeline sub-stage; and
a second pipeline sub-stage; and
second stage clocking circuitry for the second switch pipeline stage, the second clocking circuitry configured to:
receive an event trigger from the first pipeline stage, wherein the event trigger received from the first switch pipeline stage indicates that processing of the network data has reached a predetermined point in the first switch pipeline stage; and in response to receiving the event trigger:
determine, from the event trigger received from the first switch pipeline stage, a first future clocking time at which to issue a first clock to the first pipeline sub-stage in the second switch pipeline stage; and
issue the first clock to the first pipeline sub-stage at the first future clocking time.

9. The device of claim 8, wherein the second stage clocking circuitry is further configured to:
determine clock cycle content of the first clock for processing the network data in the first pipeline sub-stage.

10. The device of claim 9, wherein the clock cycle content comprises a pre-determined number of clock cycles.

11. The device of claim 8, wherein the first future clocking time takes into consideration processing latency of a different pipeline sub-stage that precedes the first pipeline sub-stage.

12. The device of claim 11, wherein the different pipeline sub-stage is in the first switch pipeline stage.

13. The device of claim 11, wherein the second stage clocking circuitry is further configured to:
determine, from the event trigger received from the first switch pipeline stage, a second future clocking time at which to issue a second clock to the second pipeline sub-stage in the second switch pipeline stage; and
issue the second clock to the second pipeline sub-stage at the second future clocking time.

14. A device comprising:
a switch pipeline stage for processing network packet data, the switch pipeline stage comprising multiple pipeline sub-stages; and
clocking circuitry in communication with the switch pipeline stage, the clocking circuitry configured to:
receive an event trigger from clocking circuitry for with a prior switch pipeline stage, the event trigger indicative that processing of the network packet data by the prior switch pipeline stage has reached a predetermined point in the prior switch pipeline stage;
determine, from the event trigger received from the prior switch pipeline stage, a first future active time at which the network packet data is to be processed in a first pipeline sub-stage among the multiple pipeline sub-stages of the switch pipeline stage; and
send a clock comprising a clock cycle after the first future active time to the first pipeline sub-stage.

15. The device of claim 14, wherein the packet data comprises start of packet (SOP) data, middle of packet (MOP) data, end of packet (EOP) data, or any combination thereof.

16. The device of claim 14, wherein the clock further comprises a clock cycle before the active time.

17. The device of claim 14, wherein the clock further comprises an additional clock cycle after the active time.

18. The device of claim 14, wherein the first pipeline sub-stage comprises a flip-flop configured to store result data generated during the active time, and wherein the clock causes the flip-flop to store the result data generated during the active time.

19. The device of claim 14, wherein the clocking circuitry is configured to determine the active time by further taking into consideration processing latency of a different pipeline sub-stage in the switch pipeline stage that precedes the first pipeline sub-stage.

20. The device of claim 14, wherein the clocking circuitry is further configured to:
determine, also from the event trigger received from the prior switch pipeline stage, a second future active time in the future at which the network packet data is to be processed in a second pipeline sub-stage of the second switch pipeline stage that is different from the first pipeline sub-stage; and
send a clock comprising a clock cycle after the second future active time to the second pipeline sub-stage.

* * * * *